United States Patent
Cai

(10) Patent No.: US 7,839,848 B2
(45) Date of Patent: Nov. 23, 2010

(54) METHOD, DEVICE AND SYSTEM FOR MESSAGE TRANSMISSION

(75) Inventor: Liyuan Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 12/002,885

(22) Filed: Dec. 19, 2007

(65) Prior Publication Data

US 2008/0107115 A1    May 8, 2008

Related U.S. Application Data

(63) Continuation of application No. PCT/CN2007/000439, filed on Feb. 8, 2007.

(30) Foreign Application Priority Data

Feb. 9, 2006    (CN) .................. 2006 1 0033606

(51) Int. Cl.
    *H04L 12/28*      (2006.01)
(52) U.S. Cl. ...................... 370/389; 370/392
(58) Field of Classification Search ............. None
See application file for complete search history.

(56) References Cited

U.S. PATENT DOCUMENTS

| | | | |
|---|---|---|---|
| 6,590,894 | B1 | 7/2003 | Kerr et al. |
| 6,717,946 | B1 | 4/2004 | Hariguchi et al. |
| 6,839,350 | B1 | 1/2005 | Inouchi et al. |
| 2003/0115358 | A1 | 6/2003 | Yun |
| 2004/0202189 | A1 | 10/2004 | Arndt et al. |
| 2005/0010925 | A1 | 1/2005 | Khawand et al. |

FOREIGN PATENT DOCUMENTS

| | | |
|---|---|---|
| CN | 1164308 | 11/1997 |
| CN | 1169224 | 12/1997 |
| CN | 1394102 | 1/2003 |
| CN | 1490724 | 4/2004 |
| CN | 1501277 | 6/2004 |
| CN | 100471180 | 3/2009 |

OTHER PUBLICATIONS

English Abstract of CN 1169224 dated Dec. 31, 1997.
English Translation of Written Opinion of the International Searching Authority for PCT Application No. PCT/CN2007/000439, mailed May 31, 2007, 4 pgs.
European Patent Office Invitation pursuant to Article 94(3) and Rule 71(1), dated Jun. 3, 2009, 3 pgs.
Office Action from the Korean Intellectual Property Office for Application No. 10-2008-7001878, dated Mar. 24, 2009, 3 pgs, English translation attached.

*Primary Examiner*—Chirag G Shah
*Assistant Examiner*—Otis L Thompson, Jr.
(74) *Attorney, Agent, or Firm*—Finnegan, Henderson, Farabow, Garrett, Dunner LLP

(57) ABSTRACT

The present invention discloses a message transmission method, a message transmission device, and a message transmission system. In an embodiment of the present invention, a message transmission device is provided. When a message is transmitted to the device, the device is responsible for message parsing, routing, and sending. In the case of communication between processes on the same communication node, the device communicates in shared memory mode; in the case of communication between processes in different hosts, the device establishes a TCP channel and communicates with TCP protocol. In addition, the present invention also provides a method and a system for message communication, which utilize the same idea to solve the problem of low efficiency of communication between processes. In conclusion, with the present invention, working efficiency of process and communication quality may be improved.

9 Claims, 2 Drawing Sheets

METHOD, DEVICE AND SYSTEM FOR MESSAGE TRANSMISSION

The present application is a continuation of PCT application PCT/CN2007/000439, filed on Feb. 8, 2007, entitled "A METHOD, AN APPARATUS AND A SYSTEM FOR MESSAGE TRANSMISSION", which is incorporated by reference herein in its entirety.

The present invention claims the priority of a Chinese Patent Application No. 200610033606.0, entitled "Method, Device and System for Message transmission", filed on Feb. 9, 2006, with the Chinese State Intellectual Property Office, the entirety of which is incorporated herein by reference.

FIELD OF THE INVENTION

The present invention relates to the technical field of communications, and particularly to a message transmission method, a message transmission device, and a message transmission system for processing message communication.

BACKGROUND OF THE INVENTION

In the technical field of communications, the communication between processes on the same communication node or between processes on different communication nodes is often involved. It is a common practice that the processes communicating with each other negotiate the message format for communication and communicate with Socket; and during the communication, the processes need to monitor message sending, choose the route for the message, and receive the message, etc. Therefore, the processes have to spend much time to process communication connection between the processes as well as packet parsing and joining, which results in a low communication efficiency.

In addition, the developers in the communication industry have to handle the details in communication between the processes repetitively, which results in a heavy repetitive workload, and also leads to a degraded reliability and stability of the communication between processes.

SUMMARY OF THE INVENTION

In view of above issues, the embodiments of the present invention provide a message transmission device, a message transmission system, and a message transmission method respectively, so as to reduce the time spent on a process when the process communicates with other processes, and avoid repetitive development of communication between processes.

The message transmission device according to an embodiment of the present invention includes:

a main control module, which is adapted to dispatch and control modules in the message transmission device, and to manage memory units.

a message routing module, which is adapted to perform routing in accordance with a destination address of a message received and a preconfigured routing table; and a message receiving & sending module, which is adapted to provide a process with a specified port, receive the message from the specified port or from a network, and send the message in accordance with a routing provided by the message routing module.

In another embodiment of the present invention, the message transmission system includes a source process, a destination process, a source message transmission device and a destination message transmission device, wherein:

the source process invokes the source message transmission device to send a message to the source message transmission device;

the source message transmission device receives the message sent by the source process, chooses a route in accordance with a destination address of the message, and sends the message to the destination message transmission device;

the destination message transmission device receives the message sent by the source message transmission device, sends the message to a specified port for the destination process, and sends a notification of message arrival to the destination process;

the destination process obtains the message from the specified port of the destination message transmission device in accordance with the notification sent by the destination message transmission device invoked by the destination process.

The source message transmission device and the destination message transmission device may be the same message transmission device.

In another embodiment of the present invention, a message transmission method is also provided, including:

receiving a message from a specified port for a process or from a communication node;

performing routing in accordance with a destination address of the message; and sending the message according to a selected route.

In the embodiments of the present invention, the process only needs to send the message to the message transmission device that is invoked during the communication, and the message transmission device is responsible for message routing, sending and receiving. Thus, the participation degree of the process during the communication is reduced and repetitive processing of communication details is avoided, and therefore the working efficiency and communication quality may be improved.

DETAILED DESCRIPTION OF THE EMBODIMENTS

In an embodiment of the present invention, a message transmission device is provided, wherein, after being invoked by a source process, the message transmission device sends a message to a destination process, without participation of the process. In addition, in an embodiment of the present invention, a message communication method is also provided. When the message is transmitted with the method, the participation degree of the process may be reduced, and thereby the operating efficiency as well as the communication quality may be improved. To make the embodiments of the present invention clearer, the embodiments will be illustrated in detail in conjunction with the drawings hereinafter.

Figure 1:
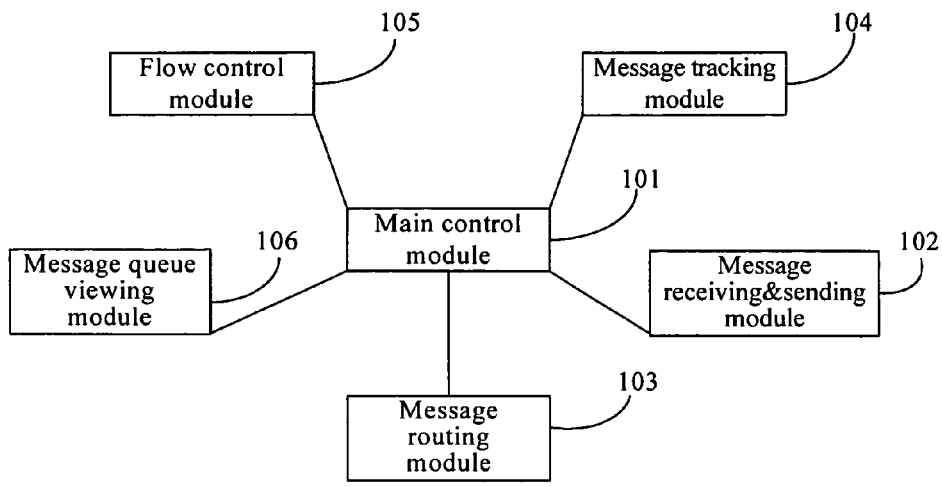
FIG. 1 is a diagram showing the modular structure of a message transmission device according to an embodiment of the present invention.
Figure 2:
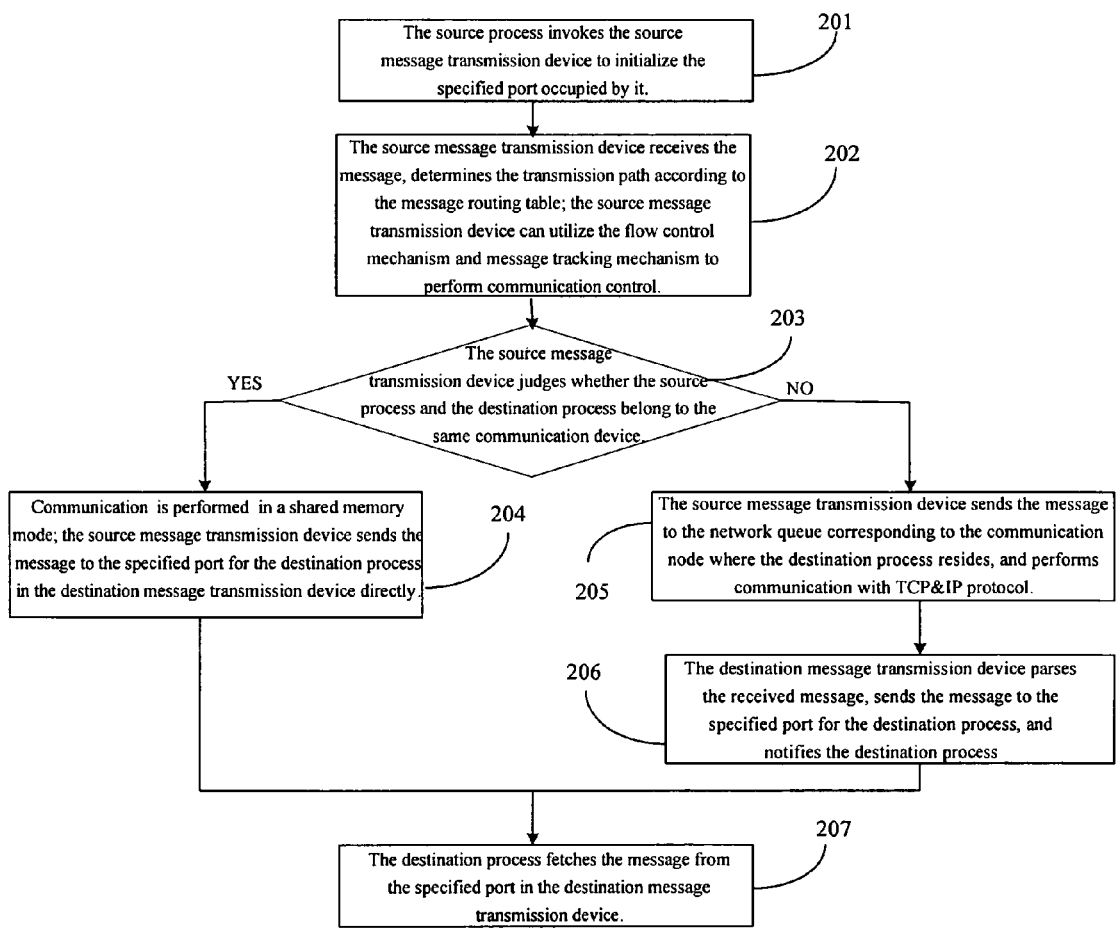
FIG. 2 is a diagram showing the flow chart of a message transmission method according to an embodiment of the present invention.

In an embodiment of the present invention, a message transmission device is provided, whose structure is shown in FIG. 1. The message transmission device at least includes a main control module 101, a message receiving & sending module 102, and a message routing module 103.

The main control module 101 is adapted to dispatch and control the modules in the message transmission device, initialize the communication ports, and allocate memory for the message during the message transmission.

The message receiving & sending module 102 is adapted to receive and send messages. The message receiving & sending module provides the message transmission device with an external communication port; the message transmission device utilizes the communication port to receive a message and sends a message in the corresponding port, i.e. the message transmission device receives a message from a source process or other message transmission device from the communication port, and sends a message to a destination process via the communication port.

The message routing module 103 extracts the destination address in accordance with the received message, and determines a message transmission path according to a message routing table.

When the process invokes the message transmission device for communication, the process firstly sends initialization parameters of a specified port to the message transmission device, and the message transmission device initializes the specified port with the initialization parameters. A port should firstly be specified before a process receives or sends a message. If other processes want to communicate with the process, the other processes should know the port used by the process to receive messages, so as to identify the destination process of the message with the corresponding port when sending the message. Therefore, the port occupied by each process is known and unique. In addition, the main control module allocates memory units for message transmission. The communication between local processes is implemented in a shared memory mode. The message sending and receiving between the process and the message transmission device may also be implemented in the shared memory mode.

The message receiving & sending module 102 receives the message sent by the process, parses the message, and then transmits the message to the message routing module 103. The message routing module 103 performs routing in accordance with the destination address of the message and the preconfigured routing table. The message receiving & sending module 102 sends the message in a message queue to the message transmission device invoked by the destination process.

The destination address of the message may include the address of the destination communication node and the specified port on the node for the destination process. The routing table in the message routing module 103 stores the mapping relation between the destination address and the output port in the message routing device for the message. If a specified port exists in the local device for the destination process of the message, the message receiving & sending module 102 puts the message into the queue corresponding to the specified port for the destination process, and the main control module 101 notifies the destination process to receive the message. If the destination process of the message is on a different communication node, the message receiving & sending module 102 puts the message into the network queue corresponding to the communication node, and the message receiving & sending module 102 sends the message to the communication node with a lower layer network protocol.

The message transmission device may provide routing and forwarding function, i.e. the message transmission device on a communication node serves as a gateway to forward messages between different network segments. For example, if the address of a communication node is an IP address, the message transmission device on the communication node may provide routing function for the process communication between two subnets or between Virtual Local Area Networks (VLANs). In another example, a message whose destination communication node address is the logical IP address of a communication node cluster may be forwarded by one or more communication nodes in the cluster to the communication node where the process that handles the message resides. When this function is implemented, in the message routing table of the message routing module 103, the output port of the corresponding destination address may be configured to be the network queue corresponding to the destination communication node of the message.

Besides above modules, the message transmission device may also include a message tracking module 104, a flow control module 105, and a message queue checking module 106.

The message tracking module 104 provides a run-time message tracking and debugging; the main control module tracks and manages a specified message by issuing instructions to invoke the message tracking module 104. With the message tracking module 104, a message may be tracked on the basis of the communication protocol provided by the message transmission device. This message tracking mechanism and the protocol tracking mechanism based on the application layer complement each other and facilitate the run-time failure locating.

The flow control module 105 provides a flow control mechanism and performs flow control for the message receiving & sending module 102 under the control of the main control module 101. When the idle level of a queue in the message transmission device is lower than a threshold, the flow control may be implemented, and the message sending capability may be suppressed with a flow control algorithm, so as to ensure the normal communication.

Each memory unit allocated by the main control module 101 for the process is configured with an idle event and a variable of the size of required free space. When the free space of a memory unit is not enough to accommodate a message, the value of the variable of the size of required free space is modified to the size of the message packet, and the occurrence of an idle event is waited for. When the message in a memory unit is taken away, the main control module judges whether the sum of available free space plus the size of the message taken away is greater than the value of the variable of the size of required free space. If it is greater, it is determined that there is an idle event, and a sending of the pending message continues; otherwise the main control module continues to wait for occurrence of an idle event.

The message queue checking module 106 provides a message queue checking mechanism to check the message sent by the message receiving & sending module 102 under the control of the main control module 101. With this mechanism, the message transmission device may learn about the situation of message receiving & sending at any time. The message queue checking module 106 provides a message mapping mechanism to map the control data in the memory units, thus the mapped control data of each memory unit may be checked, and thereby failure locating may be realized in case the message transmission device fails. The message queue checking module may be used in combination with the message tracking module 104.

During communication, the main control module 101 invokes the message tracking module 104, the flow control module 105 and the message queue checking module 106 to manage and monitor the communication, and thus ensure a normal and efficient running of the message transmission device.

In an embodiment of the present invention, a message transmission method includes the following:

the source process sends a message to a source message transmission device on the same communication node;

the source message transmission device performs routing in accordance with the destination address information in the message, and sends the message to a destination message transmission device invoked by a destination process, wherein, the destination message transmission device is on the same communication node as the destination process;

the destination message transmission device receives the message, sends the message to the specified port occupied by the destination process, and notifies the destination process to fetch the message.

Specifically, the method includes the following steps:

Step 201: the source process invokes the source message transmission device, and sends the port initialization parameters to the source message transmission device; the source message transmission device initializes the specified port.

The source message transmission device may have a plurality of specified ports, and the process needs to initialize the specified port that is occupied by the source process. During the initialization, the process needs to send the initialization parameters to the message transmission device, and the message transmission device initializes the specified port occupied by itself in accordance with the initialization parameters.

Step 202: the source message transmission device receives the message, performs relevant parsing of the message, extracts the destination address, and determines the transmission path in accordance with the preconfigured message routing table. The destination address of the message may include the address of the communication node where the destination message transmission device resides and the specified port on this node for the destination process.

The source message transmission device may use the flow control mechanism to perform flow control for the sent & received message. The source message transmission device judges the memory unit allocated for the process. If the source message transmission device has enough memory space to transmit the message, the source message transmission device continues to receive and send message; if it is determined that the memory space is not enough, the message transmission device waits, until there is enough memory space to transmit the message.

Further, the source message transmission device may use the message tracking mechanism to track a specific message. The message tracking mechanism and the protocol tracking mechanism based on the application layer may complement each other, so as to locate run-time failure related to the message.

Step 203: in accordance with the determined transmission path, the message transmission device determines whether the source process and the destination process of the two communication parties belong to the same communication node. If they belong to the same communication node, turn to step 204; otherwise, turn to step 205.

Step 204: the source message transmission device sends the message directly to the specified port occupied by the destination process in the destination message transmission device, and then turn to step S206. During this process, since the source process and the destination process of the two communication parties belong to the same communication node, the shared memory mode may be adopted during the communication, so as to improve the communication efficiency.

Step 205: the source message transmission device puts the message into the network queue corresponding to the determined transmission path, and sends the message to the destination message transmission device with TCP/IP protocol.

Step 206: the destination message transmission device invoked by the destination process receives the message sent by the source process, sends the message to the communication port occupied by the destination process in the destination message transmission device, and notifies the destination process to fetch the message.

Similar to steps 202-204, after the destination message transmission device receives the message from network, the destination message transmission device performs routing in accordance with the destination address of the message, and after it is determined that the transmission path is within the local communication node, the destination message transmission device sends the message to the specified port for the destination process.

Step 207: the destination process obtains the message from the specified port.

It is to be noted that when a communication failure occurs in the process during the communication, the message transmission device may utilize the message queue checking function to map the control data of the memory units, and check the mapped control data of each memory unit, so as to locate the failure.

With above method, after the process invokes the message transmission device, the message transmission device sends the message to the destination process, without intervention of the process. Therefore, the participation degree of the process is reduced. Meanwhile, during the communication, the message transmission device utilizes the flow control mechanism, message queue tracking mechanism, message checking mechanism, etc. to control the communications, and thereby improves the communication quality.

In an embodiment of the present invention, a message transmission system is provided. The message transmission system includes a source process, a destination process, a source message transmission device on the same communication node as the source process, and a destination message transmission device on the same communication node as the destination process.

The source process invokes the source message transmission device, and sends the message to the source message transmission device.

The source message transmission device receives the message sent by the source process, chooses the route in accordance with the destination address of the message, and sends the message to the destination message transmission device.

The destination message transmission device receives the message sent by the source message transmission device, sends the message to the specified port for the destination process, and sends a notification of message arrival to the destination process.

The destination process obtains the message from the specified port of the destination message transmission device in accordance with the notification sent by the destination message transmission device.

When the source process and the destination process are on the same communication node, the source message transmission device and the destination message transmission device may be the same message transmission device, and the communication may be implemented in the shared memory mode.

A plurality of processes may invoke the same message transmission device for communication, and a process may utilize a message transmission device to communicate with a plurality of processes.

Figure 3:
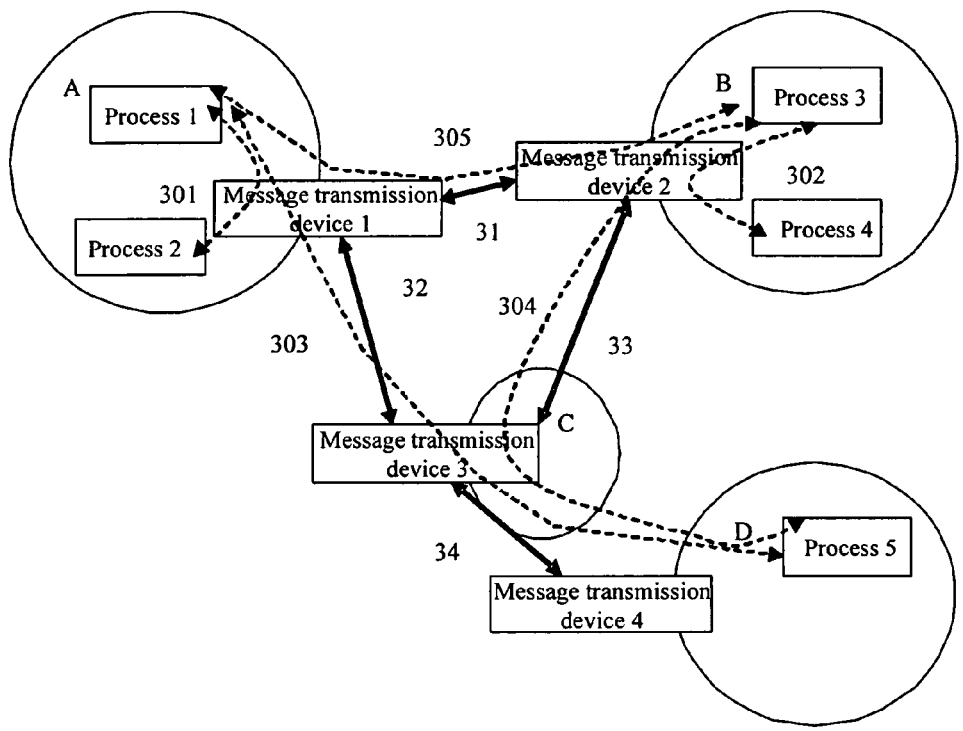
FIG. 3 is a diagram showing the application of the message transmission device according to an embodiment of the present invention.

FIG. 3 is a diagram showing the application of the message transmission device according to an embodiment of the invention. Wherein, the communication node A and communication node B are in the same network segment, and communication node A and B are not in the same network segment as communication node D. Channels 31, 32, 33 and 34 are created by the message transmission device, and are adapted to provide message transmission channels for the processes on different nodes. Communication links 301 and 302 are used for the communication between the internal processes of a communication node. Within the message transmission device, the communication is carried out in the shared memory mode. Communication link 305 is used for the communication between processes on different communication nodes within the same network segment. The message transmission devices establish the channels, so as to accomplish the communication between the processes. Communication links 303 and 304 are used for the communication between processes on different communication nodes in different network segments. The message transmission device invokes the message routing module to choose the route for the message. Here the message transmission device 3 serves for routing and forwarding. Meanwhile, the flow control module performs flow control to ensure the normal communication. In the process communication in the same node in the same network segment, in different nodes in the same network segment, or in different nodes in different networks segment, the message transmission device tracks messages to determine whether the communication is normal. In case the communication is abnormal, the message transmission device may determine the cause of the communication failure by checking the message queue.

Figure 4:
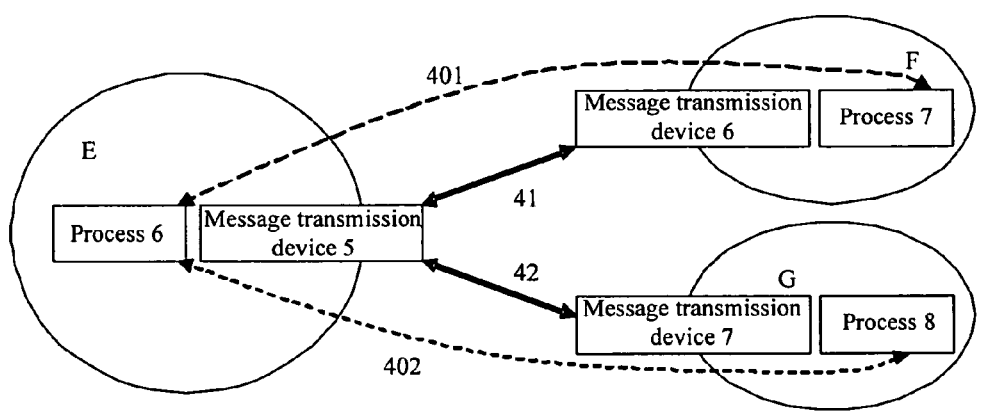
FIG. 4 is a diagram showing an application in which a plurality of message transmission devices are invoked by a process according to an embodiment of the present invention.

A plurality of processes may invoke a message transmission device to communicate with other processes. As shown in FIG. 3, process 1 and process 2 both invoke the message transmission device 1 for communication. Here, process 1 and process 2 belong to the same communication node. Meanwhile, a process may invoke a message communication module to communicate with a plurality of processes. As shown in FIG. 4, process 6 on the communication node E invokes message transmission device 5 to communicate with process 7 on the communication node F and process 8 on the communication node G. Message transmission device 5 establishes a communication link 401 with message transmission device 6; message transmission device 5 establishes a communication link 402 with message transmission device 7. The message transmission devices communicate with each other through channels 41 and 42.

With the present invention, the efficiency of the communication between processes is improved, the communication quality is ensured, the repetitive labor of the developers is avoided, and the beneficial effect is obtained.

The present invention has been described and illustrated by the preferred embodiments of the present invention and the drawings. It shall be recognized by those skilled in the art that those embodiments and drawings are merely illustrative and not restrictive, that the present invention shall not be limited thereto, and that various modifications and variations may be made thereto in light of the descriptions and the drawings without departing from the spirit and scope of the present invention as defined by the accompanying claims.

What is claimed is:

1. A message transmission device, comprising:
   a memory unit;
   a main control module in a processor, configured to dispatch and control modules in the message transmission device, and to manage the memory unit;
   a message routing module in the processor, configured to perform routing in accordance with a destination address of a message received and a preconfigured routing table, wherein the destination address comprises an address of a communication node where a destination process resides and a specified port for the destination process;
   a message receiving and sending module, configured to provide a process with a specified port, receive the message from the specified port or from a network, and send the message in accordance with a routing provided by the message routing module, wherein the message is received through a local queue if the message is from the specified port, and is received through a network queue if the message is from the network; and
   a flow control module in the processor, configured to be invoked by the main control module to perform a flow control for the message receiving and sending module;
   wherein the main control module is further configured to
     allocate the memory unit with an idle event and a variable of the size of required free space for the process;
     modify the value of the variable of the size of required free space to a message packet when a free space of the memory unit allocated for the process is not enough to accommodate a message;
     judge whether the sum of available free space plus the size of the message that is taken away is greater than the value of the variable of the size of required free space when the message in the memory unit is taken away: if it is greater, determine that there is an idle event, and a sending of the pending message continues; otherwise continue to wait for occurrence of an idle event.

2. The message transmission device of claim 1, wherein the message transmission device further comprises a message tracking module, which is configured to track the message during transmission; the main control module invokes the message tracking module to track and manage the message.

3. The message transmission device of claim 1, wherein the message transmission device further comprises a message queue checking module, which is configured to check message control data in the memory unit of the message transmission device under the control of the main control module.

4. A message transmission method, comprising:
   receiving a message from a specified port for a process or from a communication node other than a local communication node, wherein the message is received through a local queue if the message is from the specified port, and is received through a network queue if the message is from the communication node other than the local communication node;
   performing routing in accordance with a destination address of the message, wherein the destination address comprises an address of a communication node where a destination process resides and a specified port for the destination process; and
   sending the message according to a selected route, wherein the message is sent to the specified port for the destination process on the local communication node; or to the network queue corresponding to the communication node other than the local communication node;

performing flow control for the message sent and received, wherein the performing flow control for the message sent and received includes;

judging a memory unit allocated for the process, if the source message transmission device has enough memory space to transmit the message, the source message transmission device continues to receive and send message; if it is determined that the memory space is not enough, the message transmission device waits, until there is enough memory space to transmit the message;

modifying a value of the variable of the size of required free space to a message packet when a free space of the memory unit allocated for the process is not enough to accommodate a message;

judging whether the sum of available free space plus the size of the message that is taken away is greater than the value of the variable of the size of required free space when a message in the memory unit is taken away: if it is greater, determining that there is an idle event, and a sending of the pending message continues; otherwise continuing to wait for occurrence of an idle event.

5. The message transmission device of claim 4, wherein the message is sent to the specified port for the destination process on the same communication node in a shared memory mode.

6. The message transmission method of claim 4, wherein the method further comprises: receiving port initialization parameters from the process and initializing the specified port.

7. The message transmission method of claim 4, wherein the method further comprises: terminating the communication via the specified port and releasing the specified port, when a notification for releasing the specified port is received from the process.

8. The message transmission method of claim 4, wherein the method further comprises: tracking the message sent.

9. The message transmission method of claim 8, wherein the method further comprises: performing memory mapping for control data of the message.

* * * * *